US007757285B2

(12) United States Patent
Kubota

(10) Patent No.: US 7,757,285 B2
(45) Date of Patent: Jul. 13, 2010

(54) INTRUSION DETECTION AND PREVENTION SYSTEM

(75) Inventor: Makoto Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1300 days.

(21) Appl. No.: 11/231,468

(22) Filed: Sep. 21, 2005

(65) Prior Publication Data

US 2006/0288413 A1 Dec. 21, 2006

(30) Foreign Application Priority Data

Jun. 17, 2005 (JP) ............................. 2005-178105

(51) Int. Cl.
*G06F 12/14* (2006.01)
(52) U.S. Cl. ....................................... 726/23
(58) Field of Classification Search ............. 426/22–23, 426/25, 11–13
See application file for complete search history.

(56) References Cited

U.S. PATENT DOCUMENTS

| 7,120,933 | B2* | 10/2006 | Mattsson ...................... 726/22 |
| 7,331,060 | B1* | 2/2008 | Ricciulli ....................... 726/22 |
| 7,342,929 | B2* | 3/2008 | Bremler-Barr et al. ... 370/395.4 |
| 7,516,487 | B1* | 4/2009 | Szeto et al. .................... 726/22 |
| 7,523,485 | B1* | 4/2009 | Kwan ............................ 726/2 |
| 2003/0037141 | A1* | 2/2003 | Milo et al. .................. 709/225 |
| 2004/0054925 | A1* | 3/2004 | Etheridge et al. ........... 713/201 |
| 2006/0026683 | A1* | 2/2006 | Lim ............................. 726/23 |

FOREIGN PATENT DOCUMENTS

JP 2004-320636 11/2004

OTHER PUBLICATIONS

IDS (Ye et al., "EWMA Forecast of Normal System Activity for Computer Intrusion Detection", IEEE Transactions on Reliability, vol. 53 No. 4 Dec. 2004).*
Buyens (Jim Buyens, "Faster Smarter Beginning Programming", Microsoft Press, Dec. 13, 2002, ISBN-10: 0-7356-1780-5.*

* cited by examiner

*Primary Examiner*—Kambiz Zand
*Assistant Examiner*—Peter Poltorak
(74) *Attorney, Agent, or Firm*—Fujitsu Patent Center

(57) ABSTRACT

An intrusion detection and prevention device includes a retaining unit retaining at least one of attack suspicion threshold values of which levels are different from each other in order to detect a denial-of-service attack, and an attack determination threshold value, a detecting unit detecting an attack suspicion state when a frame count in the attack detection target flow exceeds the attack suspicion threshold value, and detecting an attack determination state when the frame count exceeds the attack determination threshold value, a notifying unit notifying of the attack suspicion state together with the corresponding flow information when the attack suspicion state is detected, a judging unit judging, based on a reliability level of at least one of the frame source terminal and the flow, whether the flow is blocked or not when notified of the attack suspicion state, and a requesting unit making a screening request together with notification of the corresponding flow information when the attack determination state is detected.

17 Claims, 15 Drawing Sheets

TERMINAL INFORMATION DATABASE

| MAC | IP | AUTHENTICATION CHECK | RELIABILITY LEVEL |
|---|---|---|---|
| #1b | * | NOT AUTHENTICATED | LOW |
| #1c | * | INCOMPLETE END | LOW |
| #1a | 1.1.1.128 | COMPLETED | HIGH |

TERMINAL INFORMATION DATABASE

| MAC | IP | AUTHENTICATION CHECK | POST | RELIABILITY LEVEL |
|---|---|---|---|---|
| #1b | 1.1.1.2 | COMPLETED | GENERAL POST | LOW |
| #1c | 1.1.1.5 | COMPLETED | GENERAL POST | LOW |
| #1a | 1.1.1.128 | COMPLETED | CHIEF OF SECTION | HIGH |
| OTHERS | NOT AUTHENTICATED | | — | LOW |

FIG. 10

TERMINAL INFORMATION DATABASE ~21

| MAC | OS TYPE | UPDATED PATCH VERSION NUMBER PER OS | TERMINAL PATCH UPDATED? (APPLIED VERSION NUMBER) | VIRUS INFECTION STATE | RELIABILITY LEVEL |
|---|---|---|---|---|---|
| #1b | WinXp | 2005.04.01 | × (2005.02.11) | × | ZERO |
| #1b | WinXp | 2005.04.01 | × (2005.02.11) | × | ZERO |
| #1c | Win2000 | 2005.03.25 | ○ (2005.03.25) | × | LOW |
| #1d | Win2000 | 2005.03.25 | ○ (2005.03.25) | ○ | HIGH |

INTRUSION DETECTION AND PREVENTION SYSTEM

BACKGROUND OF THE INVENTION

The invention relates to a security system against an unlawful access on a network, and more particularly to an intrusion detection and prevention system having a function of detecting and preventing a DoS (Denial of Service) attack at an early stage.

A threat on the network is an unlawful access such as the DoS attack. The DoS attack is an attacking action that makes disabled implementation of the service for terminals excluding an attacker terminal by causing a high load on the server in a way that giving, for instance, consecutive service requests from the attacker terminal on the network. The DoS attack is classified into a DoS attack (Single DoS attack) from a single attacker and a DDOS attack (Distributed DoS attack) form a plurality of attackers.

The DDOS attack takes a method of, for example, seizing a multiplicity of terminals unrelated to an attack target and attacking a target server from the respective terminals. If this attack gets successful, the server cannot provide a service. On the network, especially a measure against the DDOS attack is highly desired.

The prior art is exemplified by measures for security in each terminal and server. To be specific, these measures are patching (mending program) of an OS (Operating System) and of an application (software) and updating of a definition file of virus countermeasure software, which are executed on a terminal-by-terminal or server-by-server basis. This method depends on an operation of an administrator of each terminal, and there is a possibility that a hole (security hole) might be formed intentionally or by mistake.

Another prior art is a method of installing a device (intrusion detection and prevention device) called an IDP (Intrusion Detection and Prevention) (registered trademark) The intrusion detection and prevention device has a function of detecting and preventing (screening or blocking) various types of attacks. The intrusion detection and prevention device is in-line-installed in anteriority to a server, whereby once the attack is detected, a flow thereof can be blocked from this onwards, and this enables the server to be safeguarded from the attack.

The intrusion detection and prevention device, however, detects it to suffer the massive attack in an after-the-fact manner. The reason why so is that it is impossible to screen (from the attack) till a traffic quantity exceeds a judging criterion (threshold value) based on a quantitative or qualitative parameter to some extent in order to prevent a misdetection. Therefore, when the traffic quantity exceeds the threshold value, there remains a problem that the attacker can access the server till the attack is blocked just before the server.

It may be said to be a better scheme that the threshold value is decreased for detecting the attack, however, more misdetections might occur, and therefore this is not a solution. Further, if the attack takes place with the traffic quantity that does not exceed the threshold value, it is inevitable that the attacker can yet access the server.

Moreover, even if blocked anterior to the attack target server, problems still remain, wherein the attacker can attack a different server, and the attacking traffic continues to wastefully consume resources of the network, which is insufficient as a countermeasure.

Still another prior art is a method by which the intrusion detection and prevention device is installed not just before the server but at an boundary between the networks, and, when the intrusion detection and prevention device anterior to a certain server detects the attack, this intrusion detection and prevention device notifies the intrusion detection and prevention device on an ingress side of the network that the attack is detected, thereby logically moving a screening execution point.

Although this method has an effect in restraining the traffic within the network by distributing a processing load, the detection itself essentially the same as by another prior art described above, and hence, till the screening is completed by the intrusion detection and prevention device located in the ingress position of the network, the system still has the same problem in its hands, wherein, i.e., the attacker can access till the screening is done and if the attacking traffic quantity is equal to or smaller than the threshold value.

As discussed above, each of the prior arts is that the detection and the screening are conducted after suffering the massive attack on the attack target site, and it is impossible to prevent at an early stage the massive attacking traffic from flowing into a relay network within the site where the attacker exists by effectively detecting the DDoS attack (attacking action taking a specified method aiming at the unspecified majority of users) etc.

The following are related arts to the present invention.
[Patent document 1] Japanese Patent Application Laid-Open Publication No. 2004-320636

SUMMARY OF THE INVENTION

It is an object of the invention to provide a network security technology capable of preventing at an early stage (in real time) a massive attacking traffic from flowing into a relay network within a site where an attacker exists by effectively detecting a DDOS attack etc.

To solve the problems, an intrusion detection and prevention device of the invention is an intrusion detection and prevention device that detects a denial-of-service attack and blocks (screens from) a corresponding flow, comprises a retaining unit retaining at least one of attack suspicion threshold values of which levels are different from each other in order to detect the attack, and an attack determination threshold value; a detecting unit detecting an attack suspicion state when a frame count in the attack detection target flow exceeds the attack suspicion threshold value, and detecting an attack determination state when the frame count exceeds the attack determination threshold value; a notifying unit notifying of the attack suspicion state together with the corresponding flow information when the attack suspicion state is detected; a judging unit judging, based on a reliability level of at least one of the frame source terminal and the flow, whether the flow is blocked or not when notified of the attack suspicion state; and a requesting unit making a screening request together with notification of the corresponding flow information when the attack determination state is detected.

In this configuration, the intrusion detection and prevention device further comprises a screening unit that blocks the corresponding flow on the basis of any one of the screening judgment and the screening request.

Further, the intrusion detection and prevention device further comprises a second detecting unit detecting, as an acceleration value, a degree of increase/decrease in the frame count of the frames belonging to the flow, wherein the retaining unit retains a second attack suspicion threshold value and a second attack determination threshold value of which levels to be compared with the acceleration value are different from each other, and the detecting unit detects the attack suspicion state when the acceleration value in the attack detection target flow exceeds the second attack suspicion threshold value, and detects the attack determination state when the acceleration value exceeds the second attack determination threshold value.

Moreover, the retaining unit is retained with a plurality of attack suspicion threshold values of which levels are different from each other together with information representing respective reliability levels, the detecting unit detects the attack suspicion state when the frame count exceeds any one of the attack suspicion threshold values, the notifying unit notifies of the attack suspicion state together with the information representing the associated reliability level when the attack suspicion state is detected, and the judging unit judges, based on the information showing the notified reliability level when notified of the attack suspicion state together with the information representing the reliability level, whether to block the corresponding flow or not.

Herein, the intrusion detection and prevention device may further comprise a QoS (Quality of Service) judging unit determining a QoS control level of the flow in accordance with the information representing the notified reliability level when the judging unit judges not to block the corresponding flow.

According to the invention, a detecting operation starts at a point of time when getting suspicious of the attack, and the screening judgment is made based on the reliability level of the terminal etc., whereby a DoS attack such as an attacking action at the unspecified majority of users can be detected and prevented with higher accuracy.

Other objects, features and advantages of the invention will be apparent by reading the specification (the embodiment of the invention) that will hereinafter be described when taken up together with the drawings and the scope of the appended claims.

BRIEF DESCRIPTION OF THE DRAWINGS

FIG. 10 is an explanatory diagram of a modified example of the terminal information database;

DETAILED DESCRIPTION OF THE PREFERRED EMBODIMENTS

The invention will hereinafter be described in greater detail with reference to the accompanying drawings. The drawings illustrate preferred embodiments of the invention. The invention can be, however, carried out in many different modes, and it should not be construed that the invention is limited to the embodiments described in the specification. Preferably, these embodiments are provided in a way that makes the disclosure in the specification thorough and perfect and conveys the scope of the invention sufficiently to those skilled in the art.

[Basis Architecture and Function of System]

Figure 1:
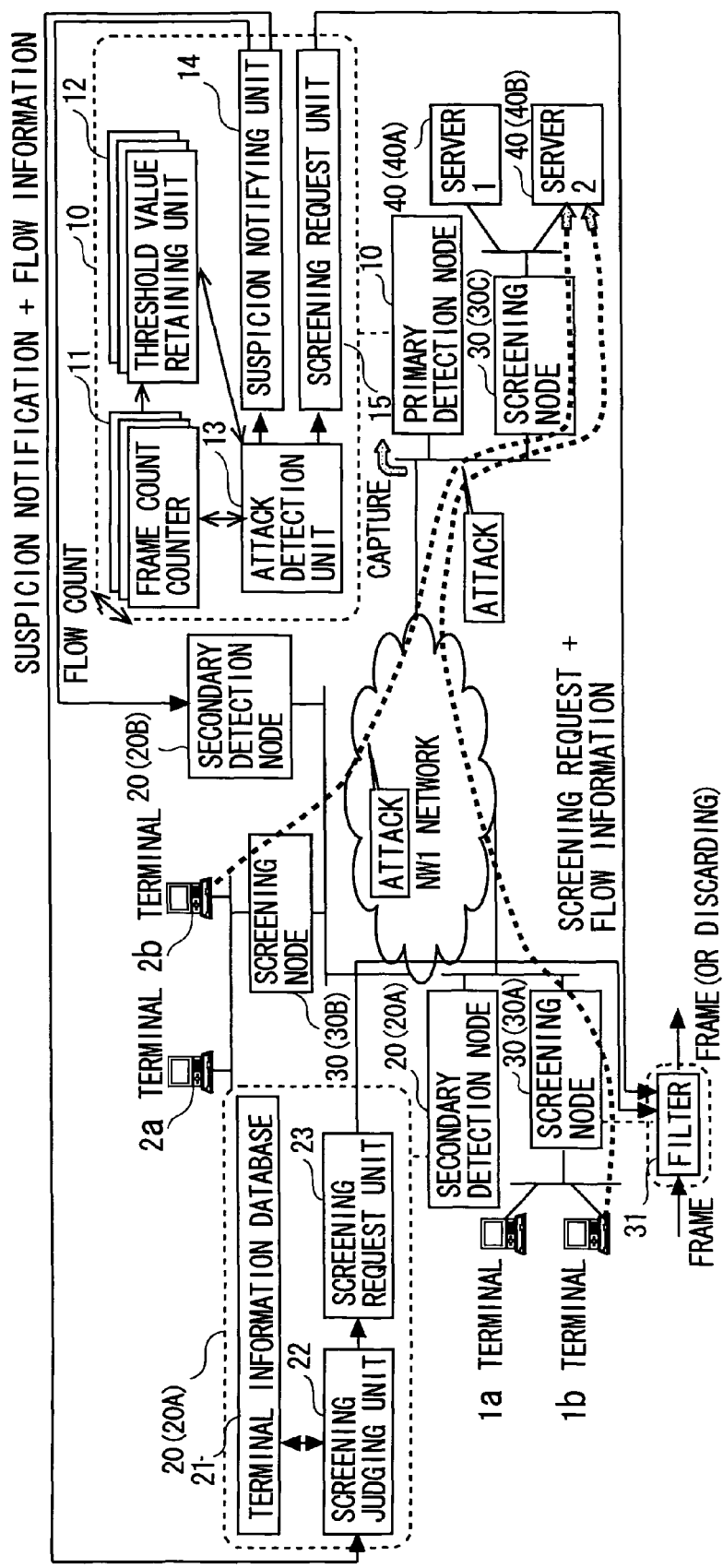
FIG. 1 is a block diagram showing a basic architecture of an intrusion detection and prevention system in one embodiment of the invention.

Referring to FIG. 1 showing a basic system architecture in one embodiment of the invention, this instruction detection and prevention (IDP) system SYS includes a primary detection node 10 detecting an attack (intrusion) in order to make screenable a terminal or a network exhibiting low reliability at a point of time when suspicious of the attack, secondary detection nodes 20 (20A, 20B) determining whether to screen off (shield) or not if suspicious of the attack, and screening nodes 30 (30A, 30B, 30C) for screening (network or terminal) from the attack. The primary detection node 10, the secondary detection nodes 20 and the screening nodes 30 can be solely in-line-disposed individually as an IDP (registered trademark) device (Intrusion detection an prevention device) or can be incorporated as an intrusion detection and prevention function into a relay device (relay node) such as a router.

In this instruction detection and prevention system SYS, the primary detection node 10 has a frame count counter 11 that counts a received frame count (the number of received frames), per unit time (predetermined period of time), of frames coincident with a specified pattern and stores (saves) the received frame count on a threshold value retaining unit 12, and the threshold value retaining unit 12 that retains values ranked (sorted) into an attack suspicion level and an attack determination level as a threshold value for detecting the attack together with the received frame count in a record containing the same destination IP address DstIP.

The primary detection node 10 further includes an attack detection unit 13 comparing the threshold value and the count value (frame count) that are retained in the threshold value retaining unit 12, detecting the suspicion of the attack when exceeding the threshold value of the suspicion level, and detecting the determination of the attack when in excess of the threshold value of the determination level, a suspicion notifying unit 14 that notifies the secondary detection node 20 of information about a flow of detecting the suspicion of the attack, and a screening request unit 15 notifying the screening node 30 of information about a flow of detecting the determination of the attack. The primary detection nodes (20A, 20B) and the screening node 30C are front-end nodes anterior to servers 40 (40A, 40B).

Each of the secondary detection nodes 20 (20A, 20B) has a terminal information database 21 retaining address information and reliability information in a way that associates these items of information with each other, a screening judging unit 22 that searches through the database 21 on the basis of the attack-suspicion-notified flow information and thus judges whether the flow is blocked or not, depending on the terminal reliability and the flow reliability, and a screening request unit 23 notifying the screening node 30 of the flow information indicating a screening target. Further, each of the screening nodes 30 (30A, 30B, 30C) has a filter 31 determining whether to relay per flow or not.

In this instruction detection and prevention system SYS, when the attack detection unit 13 of the primary detection node 10 detects the determination of the attack, the screening request unit 15 requests the screening nodes 30 (30a, 30B, 30C) corresponding to the primary detection node 10 and the secondary nodes 20 (20A, 20B) to screen from the flow via a network communication line. Further, when the attack detection unit 13 of the primary detection node 10 detects the suspicion of the attack, the suspicion notifying unit 14 notifies the secondary detection nodes 20 together with the flow information that there is the suspicion of the attack via a communication line of a network NW1 etc.

The notifying information, though based on header information and data information of the frame that are necessary for specifying the attack suspicious target, and pieces of so-called flow information such as a reception physical port number and a reception logical port number of the frame, may further include additional information such as a timestamp and a level of action emergency corresponding to a level of importance or a load state of the server.

At this time, the secondary detection node(s) 20 as the notifying destination(s) may be the whole instruction detection and prevention devices within the network system and may also be at least one instruction detection and prevention device designated by an administrator. Moreover, there may be the instruction detection and prevention device that accommodates the frame source terminal.

The secondary detection nodes (20A, 20B) receiving the notification refers to the terminal information database 21, and judges whether the flow is set as the screening target or not by use of the screening judging unit 22 thereof. If set as the screening target, the corresponding screening nodes 30 (30a, 30B) are requested to screen from the flow. The screening nodes 30 receiving the screening request executes screening from the flow so that the flow is not relayed across within the network NW1 from this onward.

Thus, in this instruction detection and prevention system SYS, the plurality of threshold values for the attack suspicion level and the attack determination level are introduced as the threshold values, and, at a point of time when suspicious of the attack, the instruction detection and prevention device that accommodates the attacker terminal (or in close proximity to the attacker terminal) judges based on the self-retained terminal information whether the screening should be done or not, thereby making it possible to prevent an influx of massive attacking traffic into the relay network at an early stage (in real time) within a site (subnet) where the attacker resides in.

[Specific Example of System]

Next, a specific configuration and an operational example in the instruction detection and prevention system SYS taking the basic architecture illustrated in FIG. 1, will be explained. What is herein assumed as an applied object of the instruction detection and prevention system SYS is an enterprise network.

(Application Address System)

Figure 2:
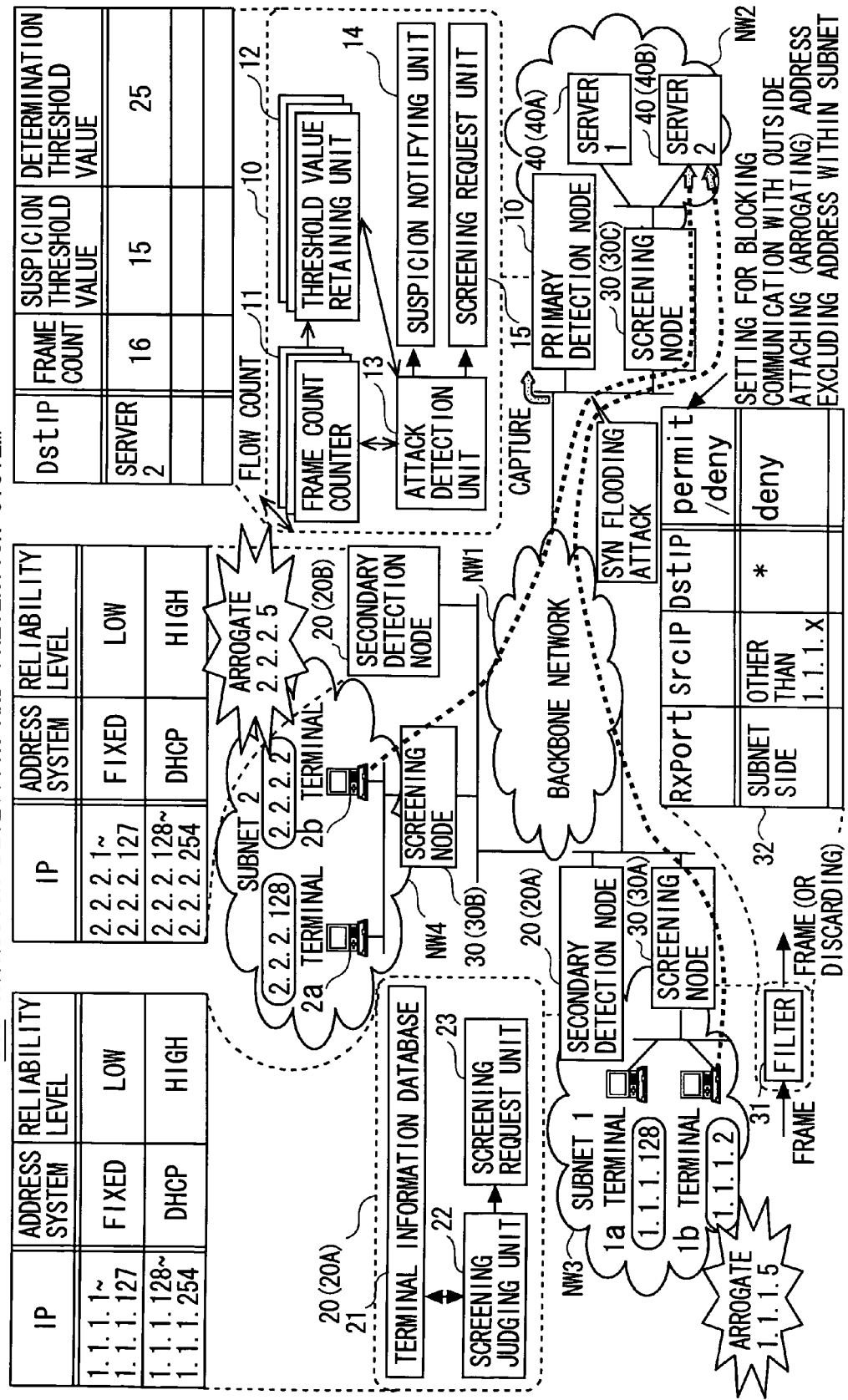
FIG. 2 is a block diagram showing a specific architecture of the intrusion detection and prevention system in one embodiment of the invention.

Referring to FIG. 2, the instruction detection and prevention system SYS involves using two types of addresses such as a fixed address and a dynamic address. Herein, the fixed address is an address that makes accessible to the network system without any procedure of authentication etc. when setting the address. On the other hand, the dynamic address is assigned by a DHCP (Dynamic Host Configuration Protocol)-based server and an authentication VLAN (Virtual Local Area Network) network, wherein when the dynamic address is set as a terminal address, the access to the network system can be permitted only in the case of clearing the procedure such as the authentication.

The secondary nodes 20 (20A, 20B) located at ingresses (edges) of subnets (Intranets) NW3, NW4 perform a role of managing the corresponding subnets, and the corresponding secondary detection nodes 20 manage the addresses and the authentication information. The terminal information database 21 is registered with, as FIG. 2 shows one example, reliability level data in association with the address type (the dynamic (DHCP) address or the fixed address).

(Assumption of Attack)

Herein, a type of the DDoS attack is assumed to be a SYN flooding attack. The SYN flooding attack connotes sending a mass of TCP (Transmission Control Protocol)-based SYN packets each having a non-existent IP address as a source address to a specified server from a plurality of attacker terminals, and is an attack that interferes with and interrupts the service.

Figure 3:
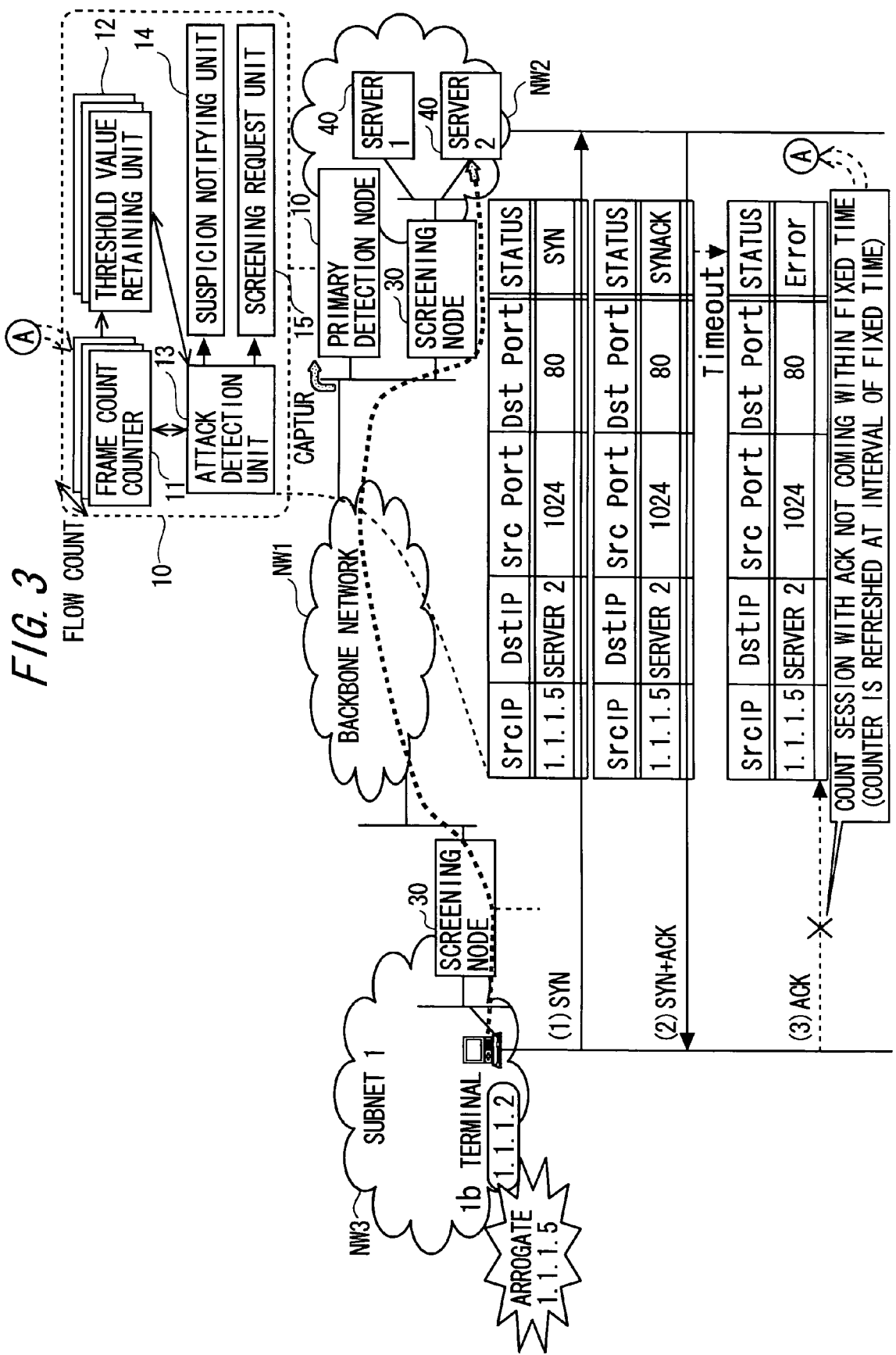
FIG. 3 is an explanatory diagram of an SYN flooding attack.

As shown in FIG. 3, the attack detection unit 13 of the primary detection node 10, for detecting this SYN flooding attack, stores a session status based on the frames transmitted and received between the terminal and the server, and, if a TCP-based 3-way handshake is not completed within a certain period of time (predetermined time), i.e., if an ACK packet corresponding to a SYN-ACK packet is not received, counts the session as an error session. The SYN flooding attack is detected when an error count about the specified server exceeds a certain threshold value. The attack detection is conducted just anterior to the servers defined as the attack concentration area, i.e., in the ingress (edge) position of the network or the subnet (Intranet) NW2 where the servers 40 (40A, 40B) reside in.

A state assumed herein is that a terminal 1b disposed in the subnet NW3 and a terminal 2b disposed in the subnet NW4 are fixed-address terminals, and a malicious person (attacker) is in a status that is unlawfully accessible to the network system, and is going to start attacking the server 40 (40B) disposed in the network NW2 by arrogating a null fixed address (e.g., 1.1.1.5 or 2.2.2.5) in the same subnet. Incidentally, a reason why the arrogation address is limited to the in-subnet address is that an out-of-subnet address is discarded due to the setting (IP address filtering) in the filter 31 of each of the screening nodes (30a, 30B) and does not therefore deserve the attack.

(Intrusion Detection and Prevention Operating Procedure)

Figure 4:
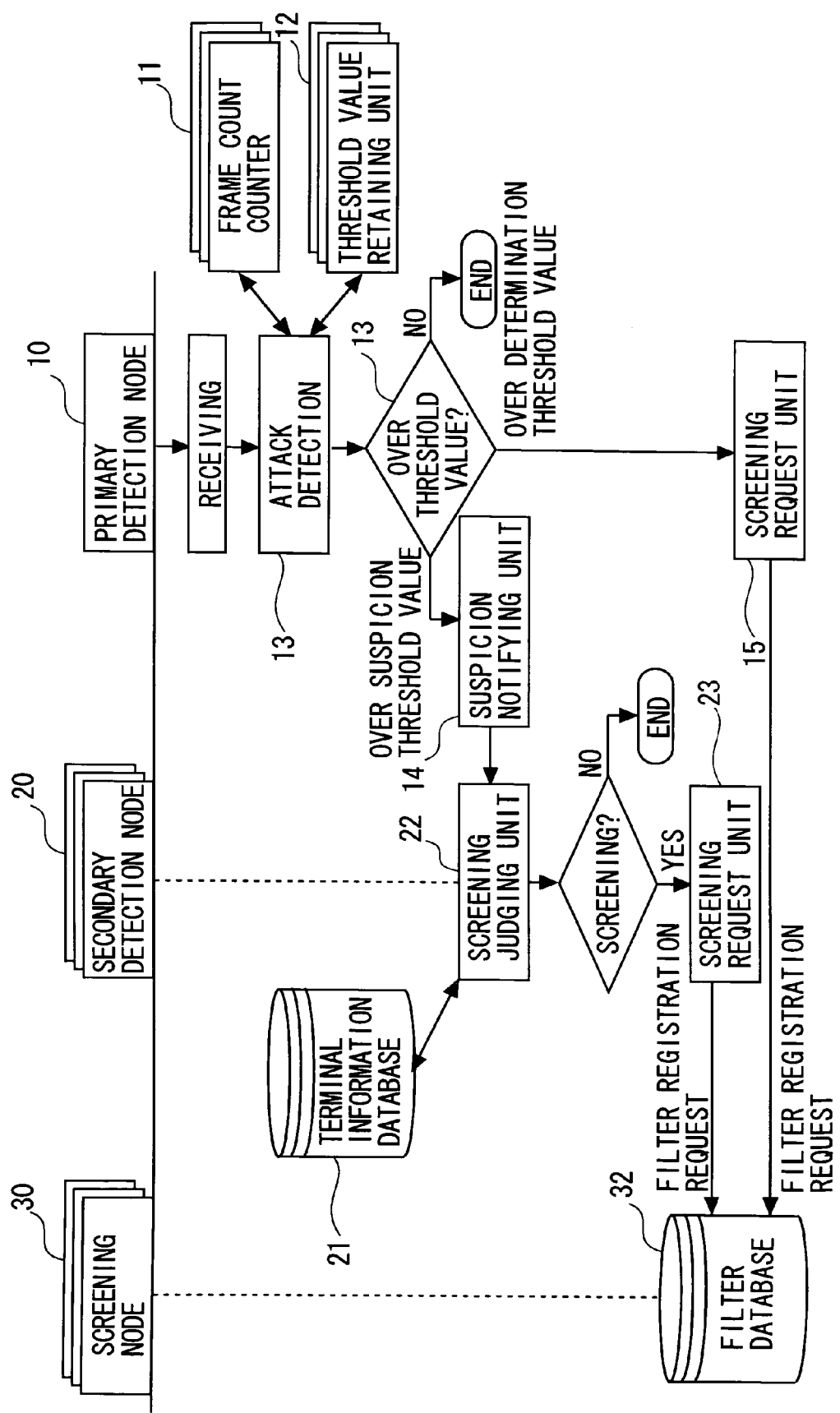
FIG. 4 is an explanatory diagram of an operating procedure of attack detection and attack prevention.

An intrusion detection and prevention operating procedure in the intrusion detection and prevention system SYS will be described with reference to FIG. 4. Similarly to the assumption of the attack, it is presumed that the terminals 1b and 2b arrogate a source address SrcIP and are on the point of doing the SYN flooding attack at the server 40 (40B).

In the primary detection node 10, the attack detection unit 13 having the SYN flooding attack detecting function explained with reference to FIG. 3 makes the counter 11 count the received frame count per unit time (predetermined time) in the TCP session coincident with the specified pattern, i.e., with the 3-way handshake uncompleted, and thereafter gets the threshold value retaining unit 12 stored with the frame count.

The attack detection unit 13 compares the count value (frame count) stored on the counter 11 with the attack suspicion threshold value and the attack determination threshold value retained on the threshold retaining unit 12. As a result of this comparison, if the received frame count exceeds the determination threshold value, the attack detection unit 13 notifies the screening request unit 15 of this purport at that point of time. The screening request unit 15 receiving the notification showing the excess over the determination threshold value requests each of the screening nodes 30 (30A, 30B, 30C) to do filter registration.

A content of the filter registration request shall be the screening for every source address SrcIP. The screening node(s) 30 as the requested node(s) may be all the relay node(s) (as determined by the administrator, i.e., a static preset content) within the network system and may also be the relay node anterior to the terminal specified by the source address SrcIP. The address information of the relay node anterior to the terminal is obtained by employing an existing tool such as Traceroute (command) or by collaboration of a network topology control server and the tool. Note that Traceroute has a function of, when starting up this tool on a certain node and operating the tool with the IP address serving as a key, displaying IP addresses of routers existing midways on that route. The relay node anterior to the terminal is located at the ingress (edge) of the subnet where the terminal resides in.

Figure 5:
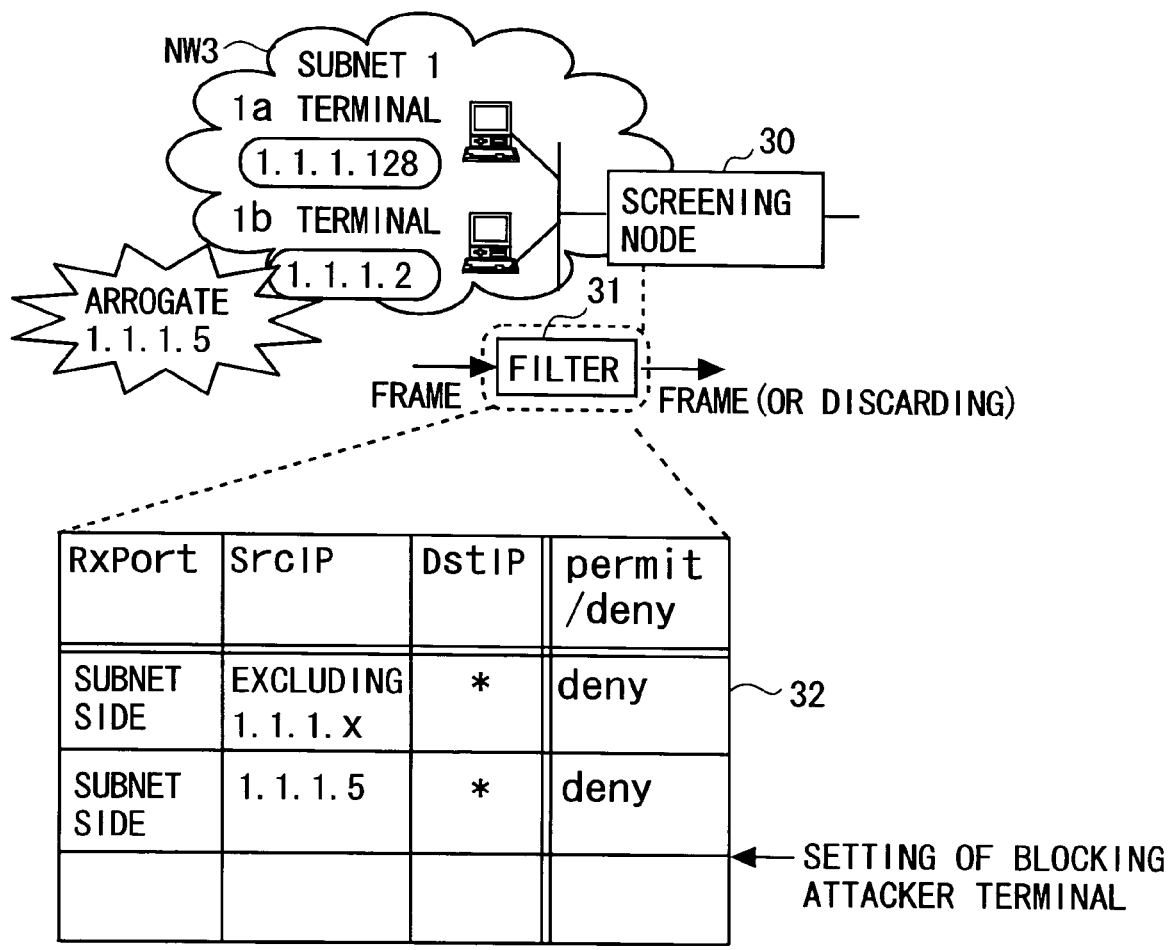
FIG. 5 is an explanatory diagram of screening setting from an attacker terminal.

Each of the screening nodes 30 (30A, 30B, 30C) receiving the filter registration request via the communication lines of the network (Internet) NW1 and the subnets NW2, NW3, NW4 from the primary detection node 10 performs, for example, as shown in FIG. 5, screen setting of the frames transmitted from the terminal in a filtering table 32 by the filter 31, i.e., sets "deny" in association with the source address SrcIP, thereby enabling prevention of the attacks by that terminal from this onwards.

Figure 6:
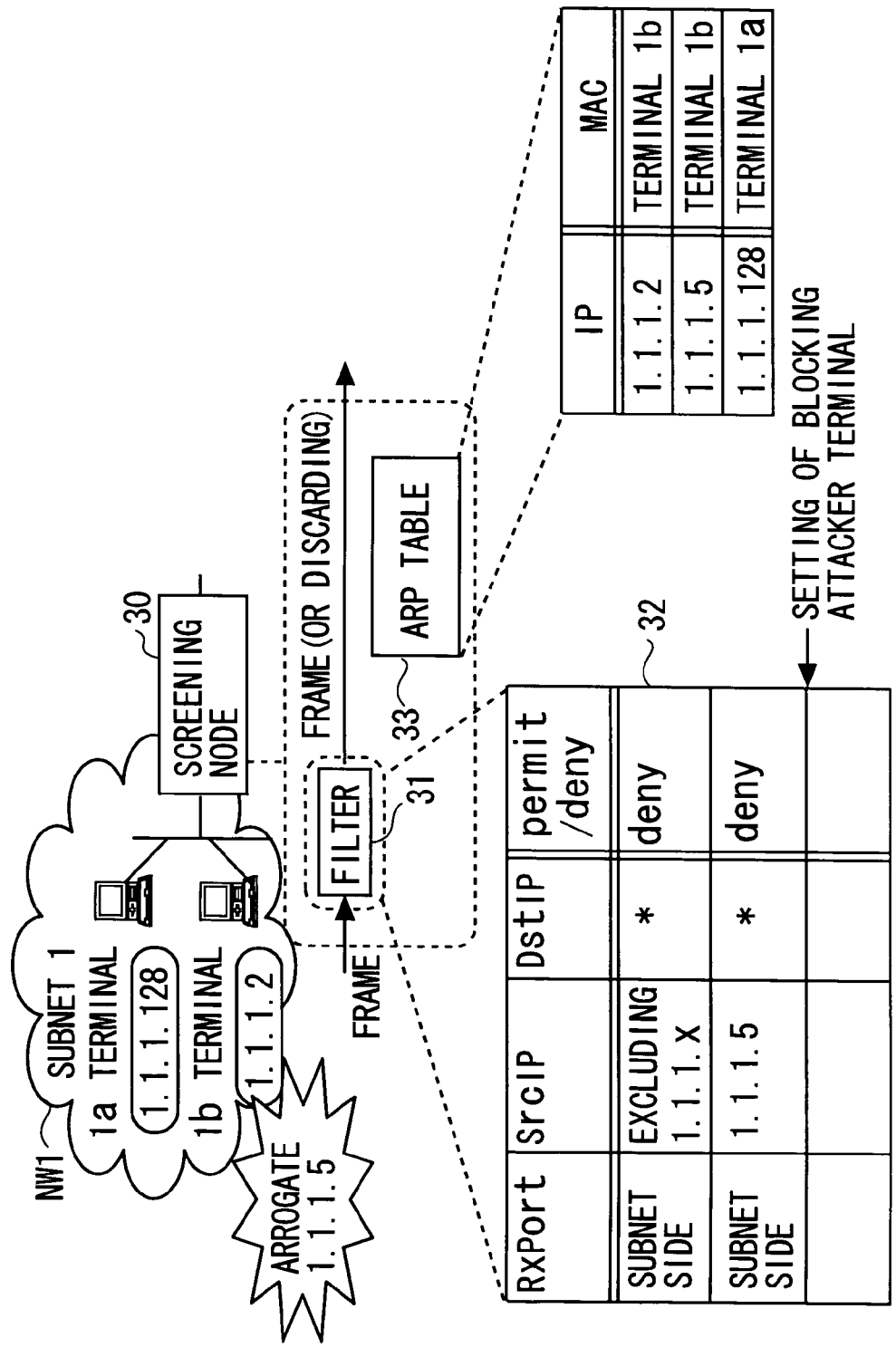
FIG. 6 is an explanatory diagram of the screening setting from the attacker terminal.

It is to be noted that FIGS. 2 and 5 exemplify the screening that uses the reception port RxPort and the source address SrcIP, however, other type of screening that employs the key information is also available. For instance, as FIG. 6 exemplifies, a MAC address mapped to the IP address is drawn out by referring to an ARP (Address Resolution Protocol)-based table 33 held by the screening node 30 in a way that uses the notified IP address as the key information, and then the screening that employs the MAC address may also be conducted.

In this intrusion detection and prevention system SYS, when exceeding the suspicion threshold value even if equal to or less than the determination threshold value, there is a possibility of the attack, and hence the suspicion notifying unit 14 of the primary detection node 10 notifies each of the secondary detection nodes 20 (20A, 20B) of the suspicion. The following cases (1) through (4) can be considered as cases applied to the suspicion of the attack.

(1) A start timing of the DDOS attack deviates between the attacker terminals, and the attack is done with a traffic quantity less than the determination threshold value at the attack start-up timing.

(2) The attacker terminal count of the DDoS attack is small, and the attack is done with the traffic quantity less than the determination threshold value.

(3) A setting value as the determination threshold value of the DDOS attack is large, and the attack is done with the traffic quantity less than this setting value.

(4) A multiplicity of frame sequences similar to the SYN flooding attack happen to occur.

Herein, a content of the notification of the suspicion shall be the source address SrcIP. The secondary detection nodes 20 as the notification receiving nodes are assumed to be all the secondary detection nodes (as determined by the administrator), however, the specified secondary detection nodes 20 may also be obtained by a topology control tool of the network system. Further, the screening nodes 30 anterior to the terminal may be acquired by the existing tool Traceroute, and the secondary detection node 20 corresponding thereto may also be obtained by querying the screening node 30. Still further, if the secondary detection node 20 is physically the same node as the screening node 30, the secondary detection node 20 may be directly obtained by Traceroute.

The screening judging unit 22 of the secondary detection node 20 receiving the notification of the suspicion via the communication lines of the networks NW1 through NW4 from the suspicion notifying unit 14 of the primary detection node 10, makes the screening judgment based on the reliability information by referring to the terminal information database 21. The key information for the screening judgment shall be the notified source address SrcIP (which is herein 1.1.1.5 or 2.2.2.5).

This network system has the low reliability when the address is the fixed address, so that the screening judging unit 22 deems the terminal to be the screening target at a point of time when judging that the address is the fixed address. If a result of the judgment made by the screening judging unit 22 indicates the screening, the screening request unit 23 requests each of the screening nodes 30 (30A, 30B) to do the filter registration. From this onwards, the screening from the attack is carried out in the same processing procedure as when exceeding the determination threshold value (see FIG. 5).

In this intrusion detection and prevention system SYS, the terminal exhibiting the high possibility of being the attacker at the early stage (early also when the deviation in the attack timing occurs) can be detected with higher accuracy by the operation described above, based on not only the traffic quantity but also the terminal reliability and the user (User) reliability, and can be thus blocked.

VARIETY OF MODIFIED EXAMPLES OF SYSTEM

Next, a variety of modified examples of the intrusion detection and prevention system SYS taking the basic architecture illustrated in FIGS. 1 and 2, will be explained.

First Modified Example

In the intrusion detection and prevention system SYS illustrated in FIGS. 1 and 2, the front-end primary detection node 10 anterior to the servers further has a database (with its illustration omitted) showing a level of importance of the servers 40 (40A, 40B), and may include a function of recognizing a load state of the server through the communications with the servers 40 (40A, 40B).

The primary detection node 10, when the suspicion notifying unit 14 notifies the secondary detection nodes 20 (20A, 20B) of the flow information, makes the information contain not only the flow information for specifying the suspicion target node but also additional information such as the level of action emergency corresponding to the level of importance and the load state of each of the servers 40 (40A, 40B).

The secondary detection node 20 stores the terminal information database with plural levels of reliability information. The secondary detection node 20 receiving the notification of the suspicion, when notified of "high" as the level of importance of the server 40 and "high" as the load state of the server 40, may judge from a combination of the level of reliability with the importance level information and the load state information obtained out of the terminal information database whether the screening is done or not.

Through this operation, the screening from the attack can be attained corresponding to the type or the status of the server 40, and a problem (trouble) can be detected before the server 40 reaches an overload.

Note that the secondary detection node 20 gives the priority to safeguarding the server 40, and, if the server 40 is in the status of being "high" as the level of importance and "high" as the load state, may block the traffic irrespective of the reliability level information on the terminal information database 21. Further, if the server 40 is in the status of being "high" as the level of importance and "high" as the load state, the primary detection node 10 may request each of the screening nodes 30 (39A, 30B, 30C) to perform the screening at that point of time.

Second Modified Example

In the intrusion detection and prevention system SYS illustrated in FIGS. 1 and 2, the respective screening nodes 30 (30A, 30B, 30C) may have a relay log.

The primary detection node 10, when the suspicion notifying unit 14 notifies of the flow information, makes the information contain not only the flow information for specifying the suspicious node but also the timestamp information. The secondary detection node 20 deems the flow about which to notify the node 20 of the screening target being suspicious as the flow from the source address SrcIP acquired by, i.e., arrogating the IP address "1.1.1.5" (see FIG. 5). As a substitute for this scheme, the secondary detection node 20 performs the screening on the basis of the source address SrcIP and the timestamp information with respect to every item of the source terminal information such as the source address (source MAC address) SrcMAC of the terminal that transmits the frame with the source address (source IP address) SrcIP as a result of referring to the relay log, and the reception physical port number or the reception logical port number.

With this scheme, even if the attacker terminal arrogates a different address afterwards, it follows that the setting of screening has already been completed, and the setting of screening with higher security resistivity can be done.

Incidentally, the relay log may be used on the occasion of the screening judgment. Namely, the terminal executing the transmission in a way that attaches plural pieces of source IP addresses SrcIP regardless of the source MAC address SrcMAC being the same, is deemed "low" of the reliability level and is blocked when receiving the notification of the suspicion.

Third Modified Example

In the intrusion detection and prevention system SYS illustrated in FIGS. 1 and 2, the setting may be such that a virus countermeasure function on each terminal can be remote-executed.

The primary detection node 10 and the secondary detection node 20, when requesting the screening node 30 to conduct the screening, forcibly operate this virus countermeasure function in combination. Moreover, the primary detection node 10 forcibly operates the virus countermeasure function at a point of time when notifying the secondary detection node 20 of the suspicion, and the secondary detection node 20 forcibly operates the virus countermeasure function at a point of time when receiving the notification of the suspicion from the primary detection node 10, respectively. This makes it possible to rid the network system of the virus much earlier.

Fourth Modified Example

In the intrusion detection and prevention system SYS illustrated in FIGS. 1 and 2, the suspicion notifying unit 14 and the screening request unit 15 of the primary detection node 10 and the screening request unit 23 of the secondary detection node 20 may give alarm notification to the screening node 30 and the deemed-to-be-attacker terminal as well.

Namely, the primary detection node 10 and the secondary detection node 20 give the alarm notification of being suspicious of the attack to the terminal deemed to be the attacker terminal when giving the suspicion notification and/or making the screening request. This scheme enables the user suffering a terminal seizure by the malicious person to recognize more easily and earlier, and enhances the possibility of taking the measure for security.

Incidentally, a scheme is not that the primary detection node 10 and the secondary detection node 20 communicate with the attacker terminal based on only the in-node information but that the alarm notification may be given to the attacker terminal via the management server (with its illustration omitted) for (managing) the topology and the node status in the network system after obtaining the terminal information from this management server. Moreover, the management server may be requested to notify of the suspicion of the attack or notify of the determination of the attack, and may give the alarm notification to the terminal.

Fifth Modified Example

Figure 7:
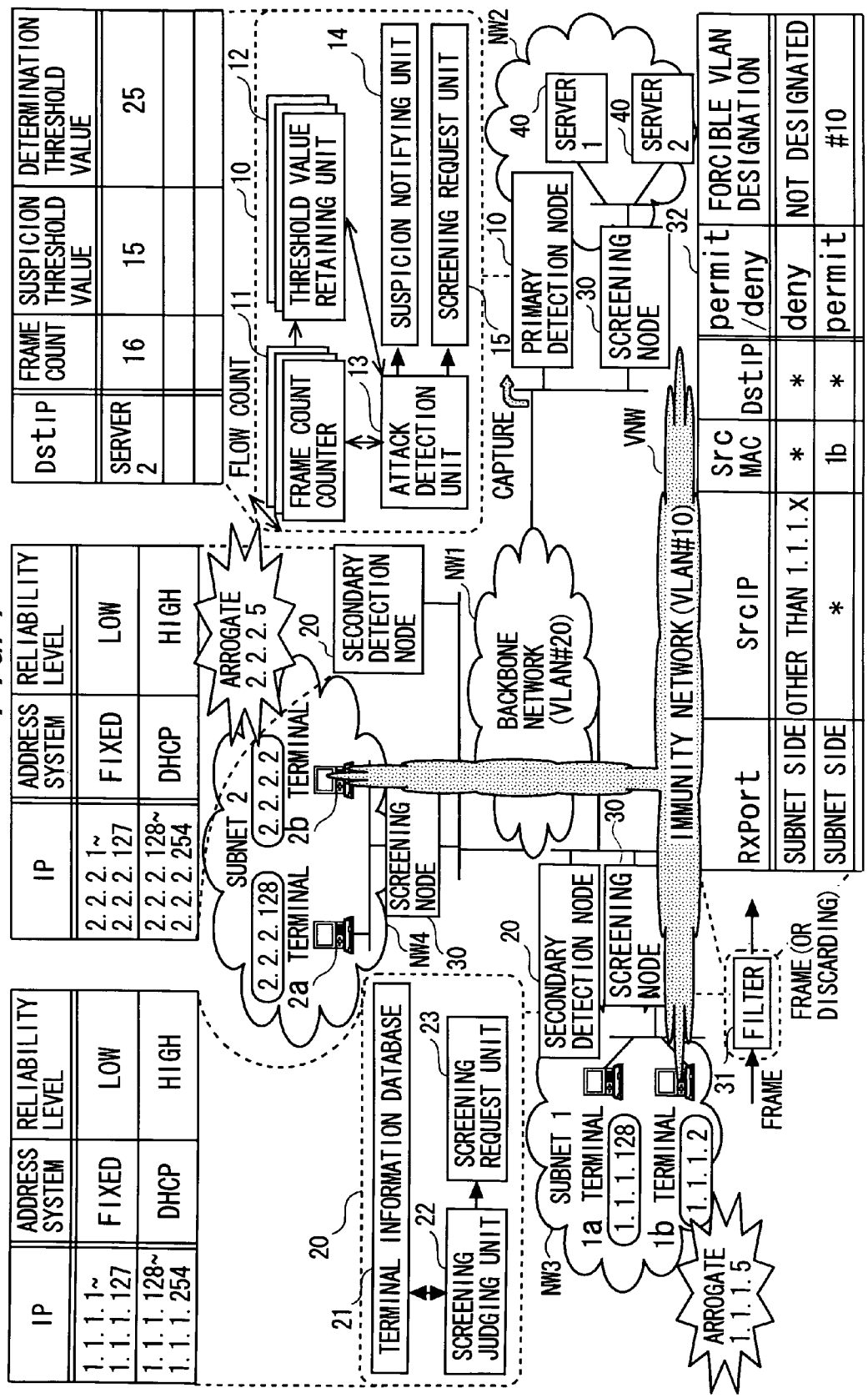
FIG. 7 is an explanatory diagram of linkage with an immunity network.

In the intrusion detection and prevention system SYS illustrated in FIGS. 1 and 2, there may be adopted a network system architecture (see FIG. 7), wherein the server capable of providing a virus definition file about the virus countermeasure function on the terminal is installed on a logical network (immunity network) VNW separately from the business network (such as the network NW1).

The screening node 30 receiving the screening request executes such a filter setting as to screen the business network and, simultaneously, to be connectable to only the immunity network VNW. With this filter setting, it is feasible to rid the network system of the virus much earlier.

Note that an environment for connecting to the immunity network VNW may be established by a layer 2 or layer 3 destination search function etc. other than by the filter 31.

Sixth Modified Example

In the intrusion detection and prevention system SYS illustrated in FIGS. 1 and 2, an authentication function is introduced.

Basically, the terminal does not get connectable to the network system unless authentication is completed.

Figure 8:
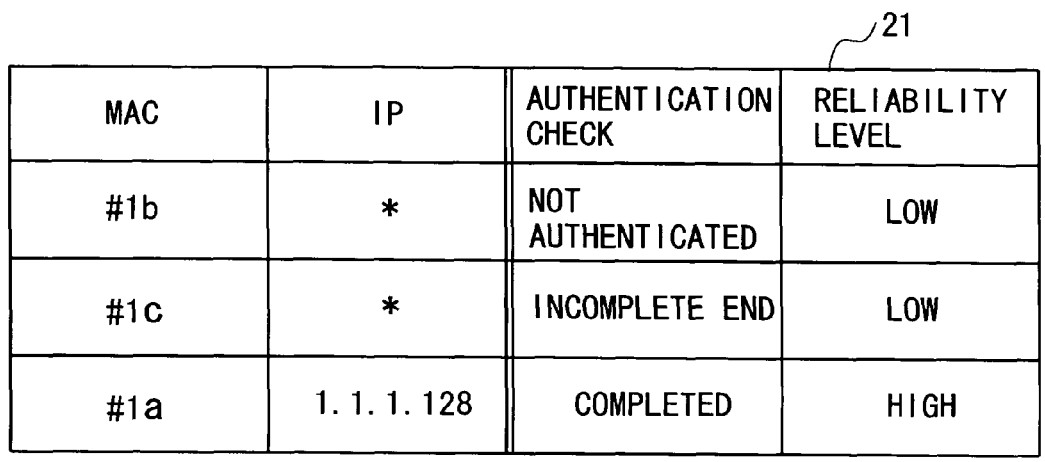
FIG. 8 is an explanatory diagram of a modified example of a terminal information database.

Only the terminal having the specified MAC address shall be, however, connected to the network system without being authenticated in consideration of an authentication function unsupported terminal. The reliability level information on the terminal information database 21 of the secondary detection node 20 is associated with an already-authenticated-or-not check value and with an authentication-unrequired-MAC-address-or-not check value. The secondary detection node 20, when the authentication about the terminal is completed, registers the database 21 with the reliability level information in combination with the authentication status. The reliability level of the MAC address enabling the connection to the network system without the authentication, is set low (see FIG. 8).

This scheme makes it possible to increase the accuracy of judging whether the terminal is the attacker or not. It should be noted that if ending with the complete authentication, [low] is set in the reliability level information on the database 21. Moreover, the database 21 may also be organized in such a way that the authentication itself is conducted by another authentication node, and the secondary detection node 20 is notified of a result of this authentication.

Seventh Modified Example

The intrusion detection and prevention system SYS illustrated in FIGS. 1 and 2 has, in addition to the authentication function in the sixth modified example described above, a function of managing the user of each terminal.

Figure 9:
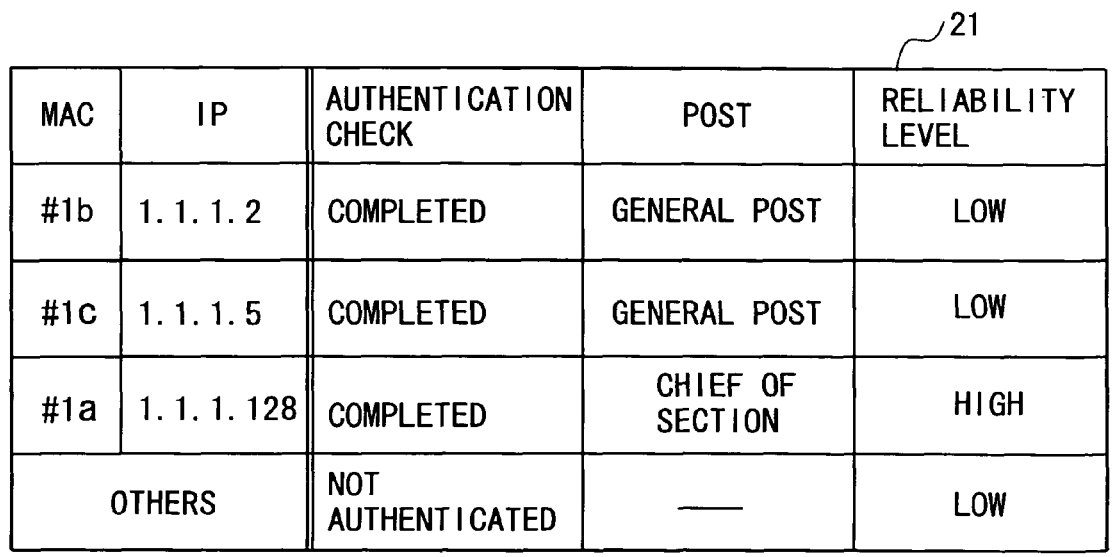
FIG. 9 is an explanatory diagram of a modified example of the terminal information database.

The reliability level information on the terminal information database 21 of the secondary detection node 20 is associated with the terminal user. The secondary detection node 20, upon the completion of the authentication about the terminal, registers the database 21 with the reliability level information according to a post of the authentication user (see FIG. 9).

With this scheme, the accuracy of judging whether the terminal user is attacker or not can be increased. Note that pieces of information related to the post and the reliability level may also be statically associated with a terminal address (the source MAC address SrcMAC or the source IP address SrcIP) regardless of the authentication.

Eighth Modified Example

The intrusion detection and prevention system SYS illustrated in FIGS. 1 and 2 involves managing a security patch (mending program) application level and a virus infected state of each terminal.

The reliability level information on the terminal information database 21 of the secondary detection node 20 is associated dynamically with the security patch application level and with the virus infected state. The secondary detection node 20 has a function of periodically monitoring the security patch application level and the virus infected state of each terminal, then registering a result of this monitoring on the database 21, and also registering the reliability level information associated with these states on the database 21.

FIG. 10 shows one example of the database 21. The reliability levels in FIG. 10 are set as follows.

(1) If the virus infection is already known, the reliability level is [zero].

(2) Though not infected by the virus just when subjected to a final inspection, if the updated patch is not applied to the terminal, the reliability level is [low].

(3) If not infected by the virus just when subjected to the final inspection and when the updated patch is applied to the terminal, the reliability level is [high].

The screening judging unit 22 of the secondary detection node 20, if the reliability level of the terminal receiving the notification is [high] or [low], operates according to the operating procedure described with reference to FIG. 4. The screening judging unit 22, however, if the reliability level is [zero], as the terminal is infected by the virus, requests the screening request unit 23 to perform the screening. Note that if the reliability level is [zero], there may be a further additional process. Namely, if already infected by the virus, there may be taken a special measure such as giving abnormality notification to, e.g., the node management server in the system by judging that the screening from this terminal is not completed irrespective of the recognition by the system.

This scheme makes it feasible to increase the accuracy of judging whether the terminal is the attacker or not. It is to be noted that the database 21 may be organized in such a way that the patch application level and the virus state are monitored and registered by another node, and the secondary detection node 20 is notified of the results thereof.

Ninth Modified Example

The intrusion detection and prevention system SYS illustrated in FIGS. 1 and 2 may take such a mode that the judgments as to the suspicion of the attack and the determination of the attack are made based on not only the received frame count within a fixed period of time (predetermined time) but also an increase/decrease (acceleration) in the received frame count.

Figure 11:
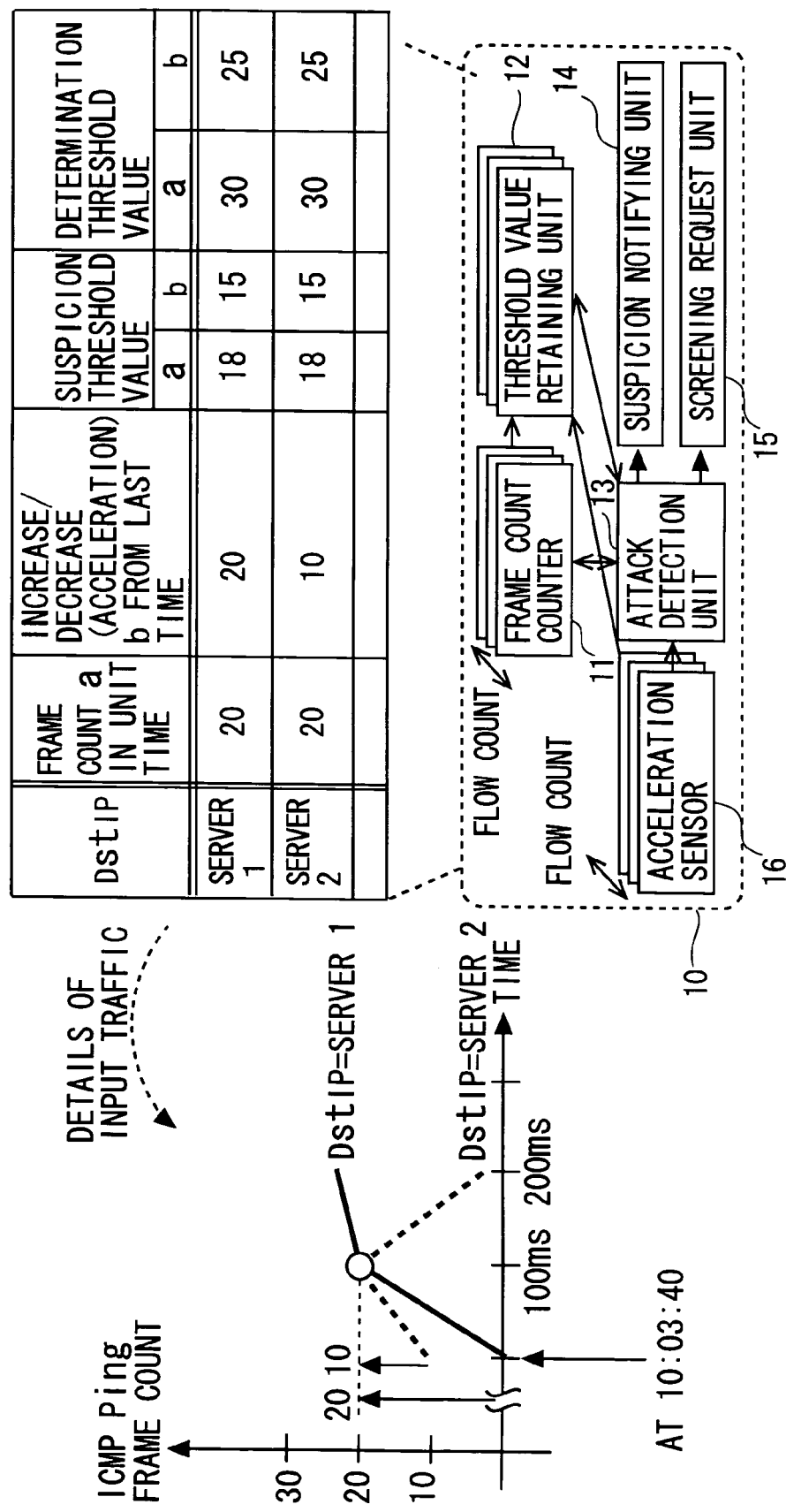
FIG. 11 is an explanatory diagram of a modified example of a primary detection node.

Referring to FIG. 11, the primary detection node 10 further includes an acceleration sensor 16 that detects an increase/decrease (acceleration) between the count value per unit time one before and the present count value per unit time, i.e., an absolute value (acceleration value) of a difference on a flow-by-flow basis when the counter 11 counts the number of frames within the unit time (predetermined time) with respect to the received frames, and stores (saves) this absolute value on the threshold value retaining unit 12.

In the intrusion detection and prevention system SYS in this modified example, the type of the DDos attack shall be an ICMP (Internet control Message Protocol) flooding attack. The ICMP flooding attack connotes an attacking action that depletes resources of the network system by making a massive ICMP Echo request at one time with the intention of causing the overload on the network system and by a response to this request.

In the intrusion detection and prevention system SYS, for detecting this attack, if the number of ICMP Echo packet (Ping packets) to the server 40 is equal to or larger than the threshold value, this is detected as an error.

Herein, it is assumed that the Ping packets are originally constantly sent to the server (#2) 40B, and the server (#1) 40A will have suffered the ICMP flooding attack. As exemplified in FIG. 11, the attack detection unit 13 compares the acceleration value together with an ICMP Ping frame count per unit time (which is herein 100 ms) with the suspicion threshold value and the determination threshold value, thereby judging about the suspicion of the attach and the determination of the attack.

As for the server (#2) 40B, an acceleration value [10] is smaller than a suspicion threshold value [15], and hence none of the suspicion of the attack is detected as a result of the comparison made by the attack detection unit 13. On the other hand, the attack detection unit 13, as for the server (#1) 40A, since both of a frame count [20] and an acceleration value [20] exceed suspicion threshold values [18] and [15], judges this to be the suspicion of the attack and notifies the secondary detection node 20 of the suspicion. With this operation, it is possible to distinguish between the normal traffic and the attack in the network system with the higher accuracy.

Note that there exists such a type of attack that starts an intensive attack at a certain moment and halts the attack for a short while thereafter as by, e.g., a computer worm called Blaster, and therefore the detection based on the acceleration given above is further effective in detecting this type of attack. The condition for the judgment by the attack detection unit 13 may be only the acceleration value.

Tenth Modified Example

In the intrusion detection and prevention system SYS illustrated in FIGS. 1 and 2, the judgments as to the suspicion of the attack and the determination of the attack may adopt a mode of making the judgments corresponding to a suspicion notification count related to the same address.

Figure 12:
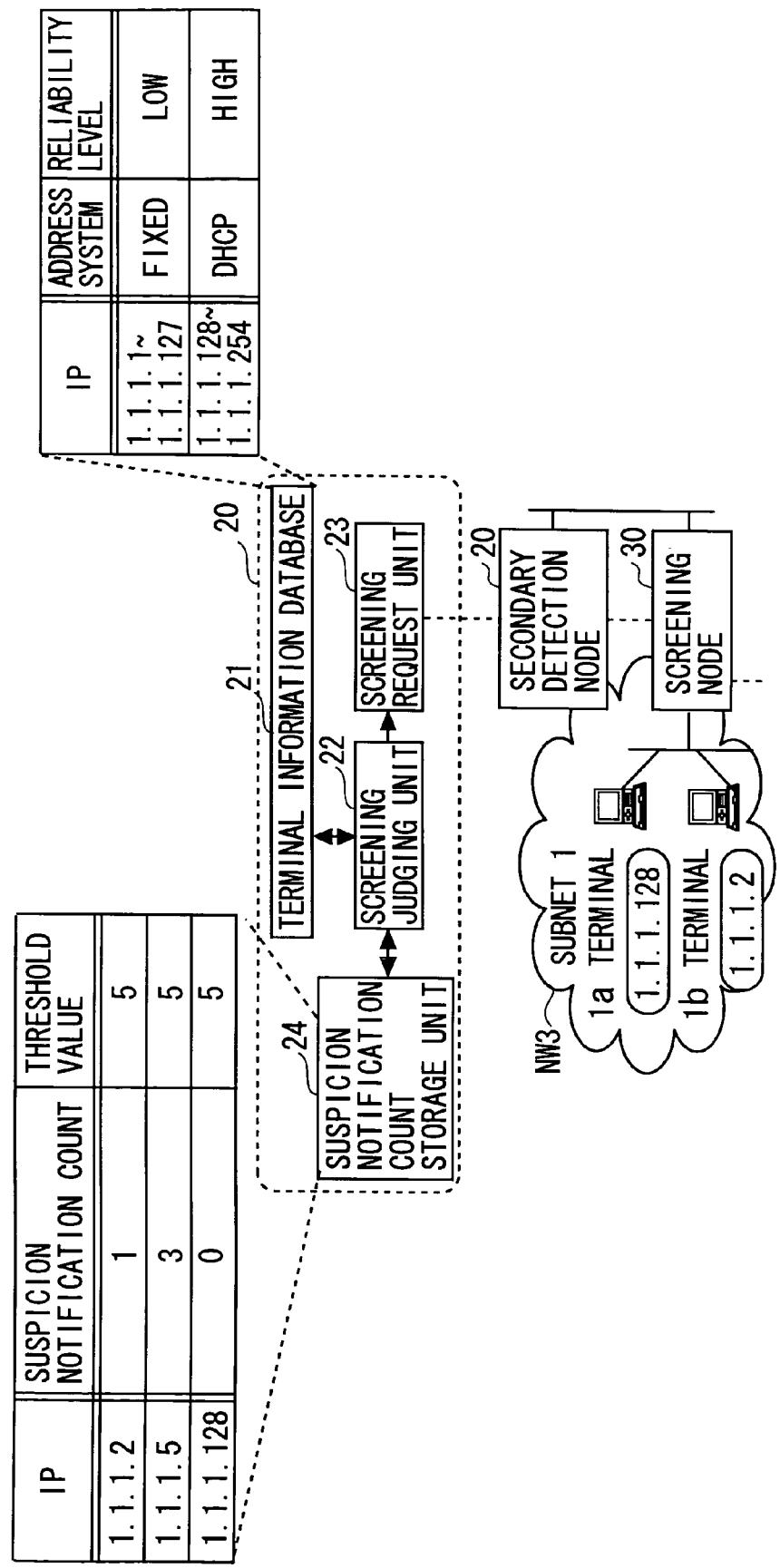
FIG. 12 is an explanatory diagram of a modified example of a secondary detection node.

In the intrusion detection and prevention system SYS in the tenth modified example, as shown in FIG. 12, the secondary detection node 20 further includes a suspicion notification count storage unit 24 that retains the suspicion notification count and a threshold value thereof. In the secondary detection node 20, the suspicion notification count storage unit 24, when receiving the suspicion notification via the network communication line from the suspicion notifying unit 14 of the primary detection node 10, counts and self-retains the notification count on a notified flow-by-flow basis (for every IP address).

The way of the screening judgment is that the screening judging unit 22 determines the attack if the suspicion detection count on the suspicion notification count storage unit 24 exceeds the threshold value thereof in addition to being based on the reliability level information on the terminal information database 21 as described above. The screening request unit 23 requests the corresponding screening node 30 to do the filter registration in accordance with this screening judgment made by the screening judging unit 22.

Thus, it is possible to increase the accuracy of judging whether it is a true attacker or not by setting the suspicion notification count as the judgment condition. Note that the screening judgment by the screening judging unit 22 may also be made based on the suspicion notification count.

Eleventh Modified Example

In the intrusion detection and prevention system SYS illustrated in FIGS. 1 and 2, the suspicion threshold value preset on the threshold retaining unit 12 of the primary detection node 10 may take a mode having a plurality of levels.

Figure 13:
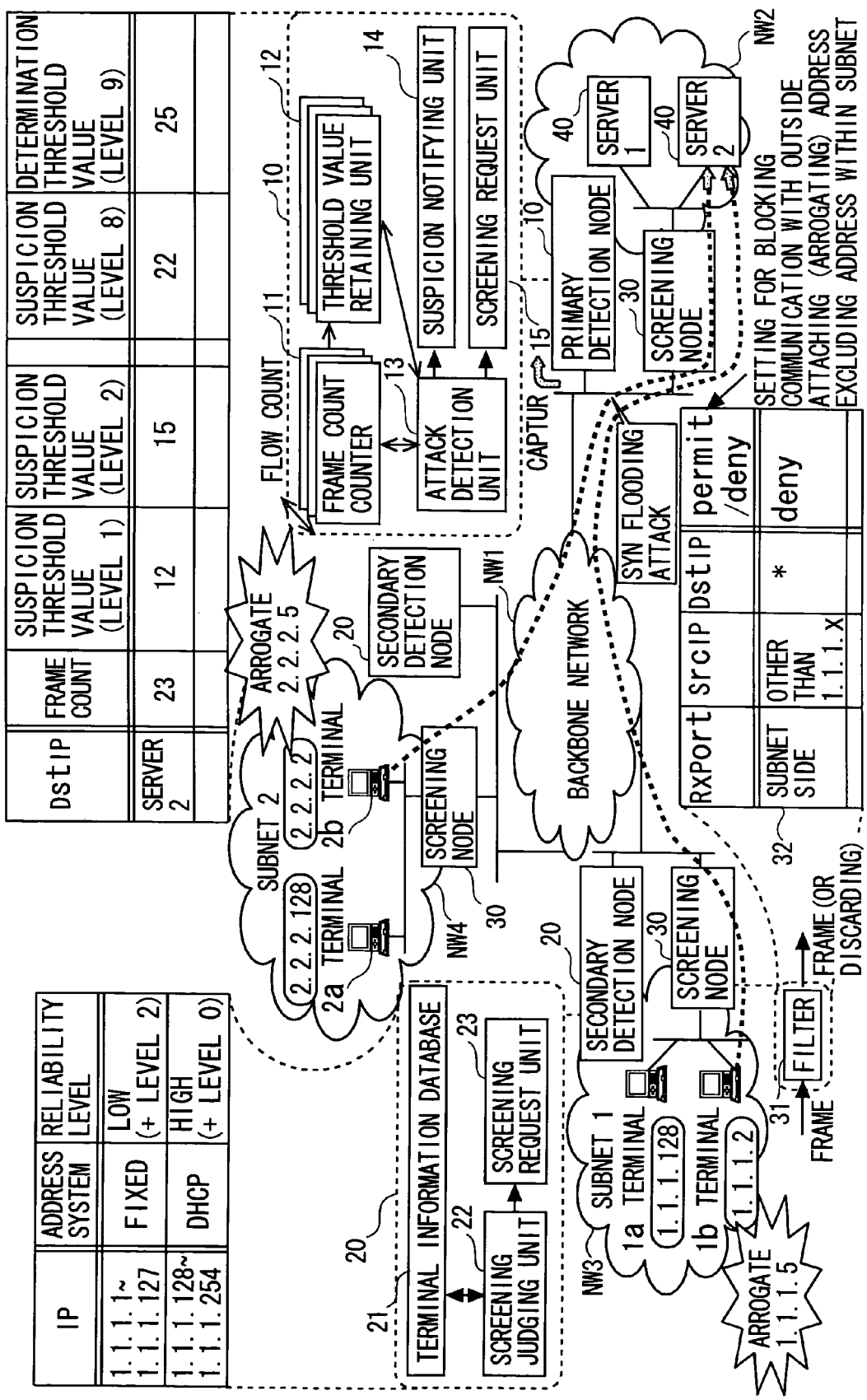
FIG. 13 is an explanatory diagram of a modified example of setting a plurality of attack suspicion threshold values.

In the intrusion detection and prevention system SYS in the eleventh modified example, as shown in FIG. 13, eight pieces (eight levels) of suspicion threshold values for detecting the suspicion of the attack can be set on the threshold value retaining unit 12, wherein the reliability levels 1-8 are assigned to excesses of the respective threshold values. The reliability gets lower as the reliability level has a higher numerical value, and a reliability level 9 represents the determination of the attack.

It is supposed that the attack detection unit 13 of the primary detection node 10 detects the suspicion corresponding to, e.g., the reliability level 8. The suspicion notifying unit 14 of the primary detection node 10 gives, to the secondary detection node 20, the suspicion notification containing the reliability level value via the network communication line.

In the secondary detection node 20, the screening judging unit 22 adds the reliability level value obtained from the terminal information database 21 to the notified reliability level value. As a result, when the reliability level value becomes equal to or higher than [9], the screening request unit 23 requests the screening node 30 to perform the screening via the network communication line. For example, supposing that the IP address associated with the attack suspicion flow be 1.1.1.5, the reliability level comes to 8+2=10, which is larger than 9, and hence this becomes the screening request target. Thus, the reliability is given fine-defined levels, whereby the detection accuracy can be improved.

Twelfth Modified Example

The intrusion detection and prevention system SYS illustrated in FIGS. 1 and 2 may adopt a mode of associating the reliability level of the reliability level information retained on the terminal information database 21 of the secondary detection node 20 with a priority level of QoS (Quality of Service).

Figure 14:
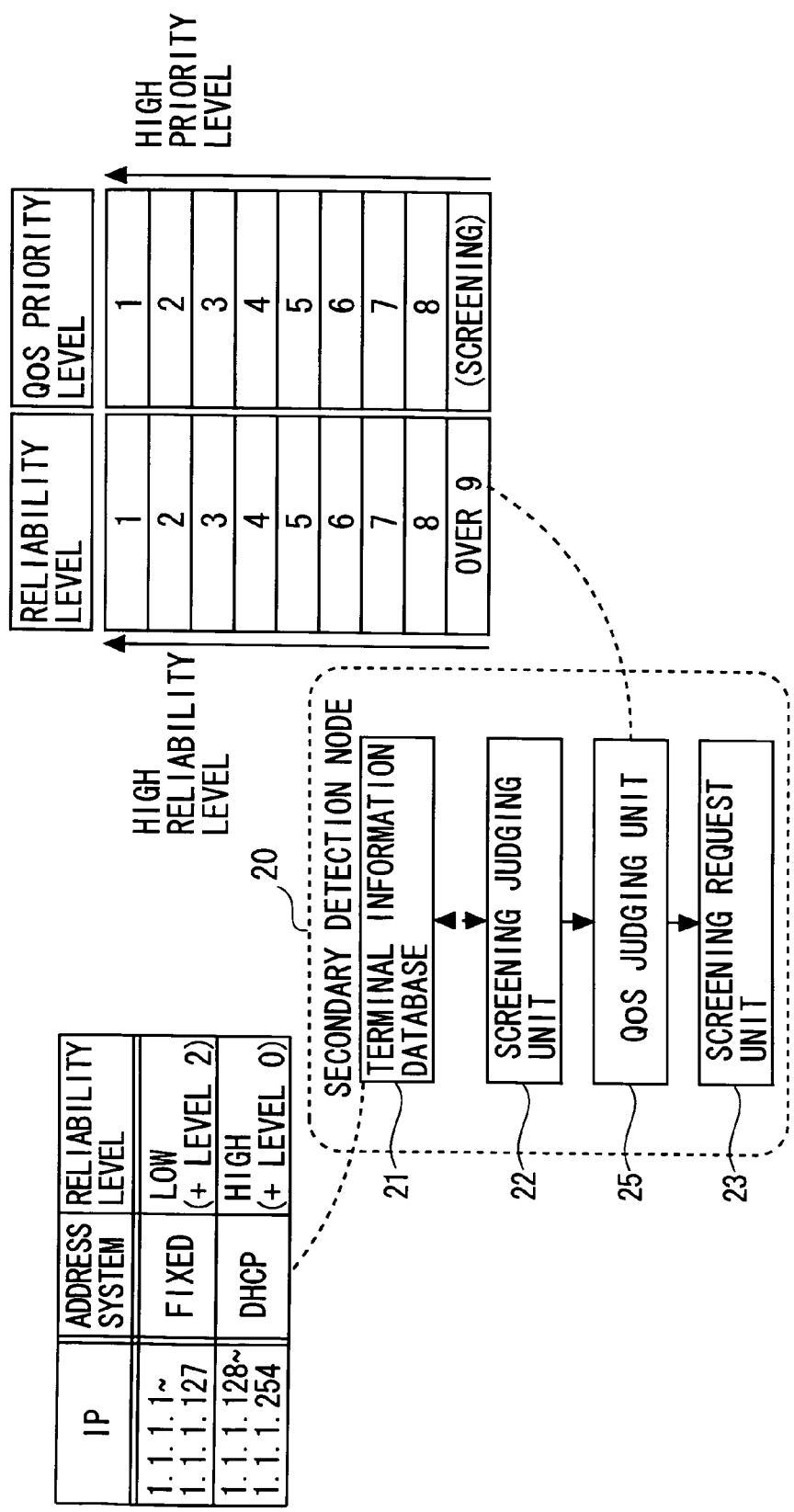
FIG. 14 is an explanatory diagram of a modified example of the secondary detection node.

In the intrusion detection and prevention system SYS in the twelfth modified example, as shown in FIG. 14, the secondary detection node 20 further includes a QoS judging unit 25 that associates the reliability level with the QoS priority. The screening request unit 23 has a function of not only giving the flow screening instruction but also making a QoS priority designating request about the suspicious flow.

It is assumed that the attack detection unit 13 of the primary detection node 10 detects the suspicion of the attack exhibiting, e.g., the reliability level 8. In the secondary detection node 20 receiving the suspicion notification from the suspicion notifying unit 14 of the primary detection node 10 the screening judging unit 22 acquires the final (added) reliability level (refer to the eleventh modified example) by referring to the reliability level information on the termination information database 21. The QoS judging unit 25, after acquiring the final reliability level from the screening judging unit 22, converts this reliability level into a QoS priority (level). The QoS judging unit 25 effects this conversion based on the mapping (the reliability-to-priority corresponding relation) shown in FIG. 14.

Herein, an assumption is such a case that the final reliability level is [8], i.e., the flow is very high of attack suspicion level. The QoS priority level corresponding to the reliability level 8 of which the QoS judging unit 25 notifies the screening request unit 23, is [8], and therefore the screening request unit 23 requests the screening node 30 to execute the following process about this flow.

Supposing that a just-before processing status in the screening node receiving the QoS priority level designating request from the screening request unit 23 is the screening instruction [unmade] and the QoS priority level is [7], the screening node 30 changes the QoS priority level about the flow into [8]. The QoS priority level 8 represents the lowest priority level, and consequently, normally if there is much traffic, it follows that this flow is discarded within the screening node 30. This scheme makes it possible to prevent the resources in the network system from being depleted by the attack.

Note that according to the conversion algorithm from the reliability level into the QoS priority level, the level associated with the suspicion threshold value may be set directly as a value of the QoS priority level. Further, the reliability level may be transferred and received between the primary detection node 10 and each of the screening nodes (30A, 30B) without via the secondary detection node 20, and may be mapped to the QoS priority level in the screening node 30.

Thirteenth Modified Example

Figure 15:
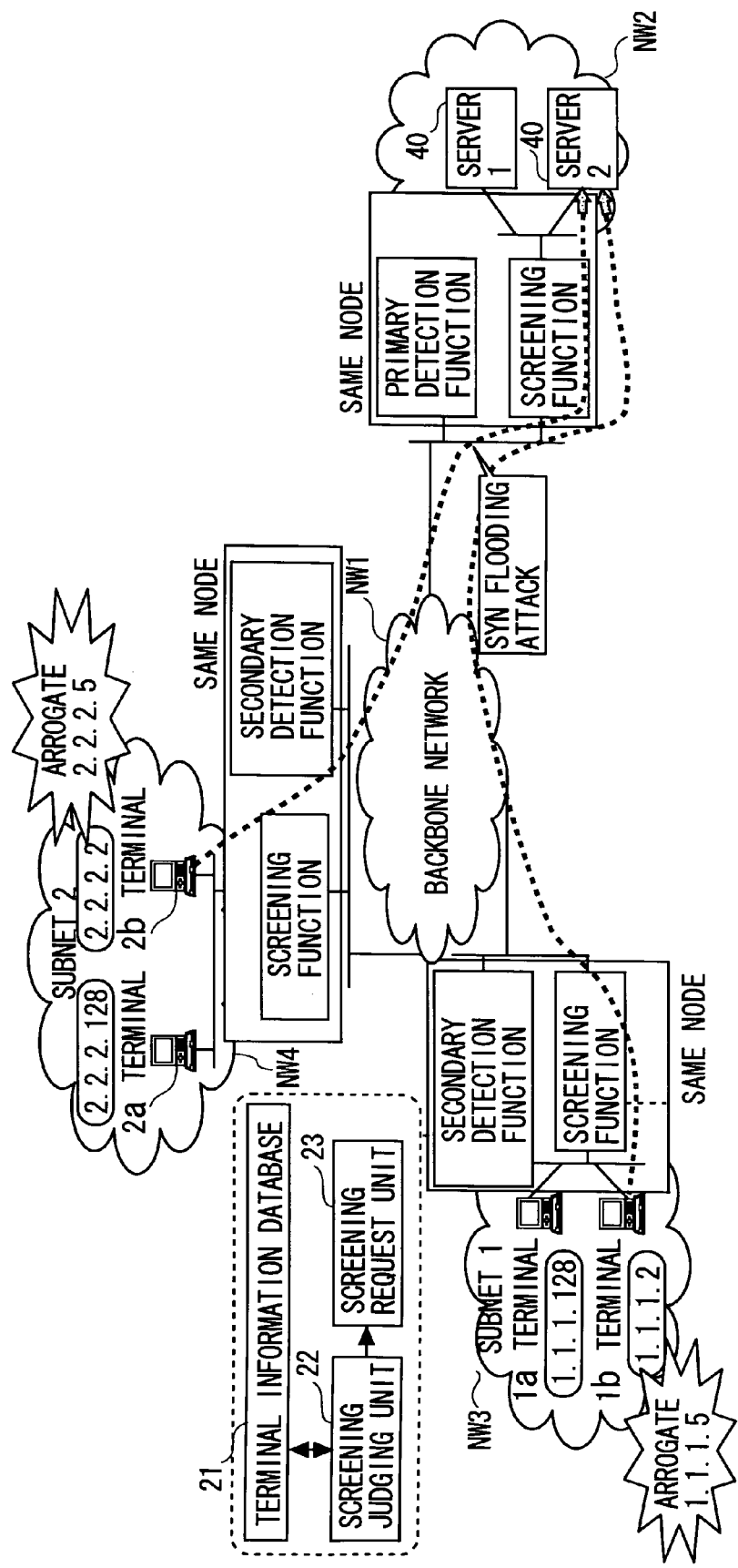
FIG. 15 is an explanatory diagram of a modified example of each node.
Figure 16:
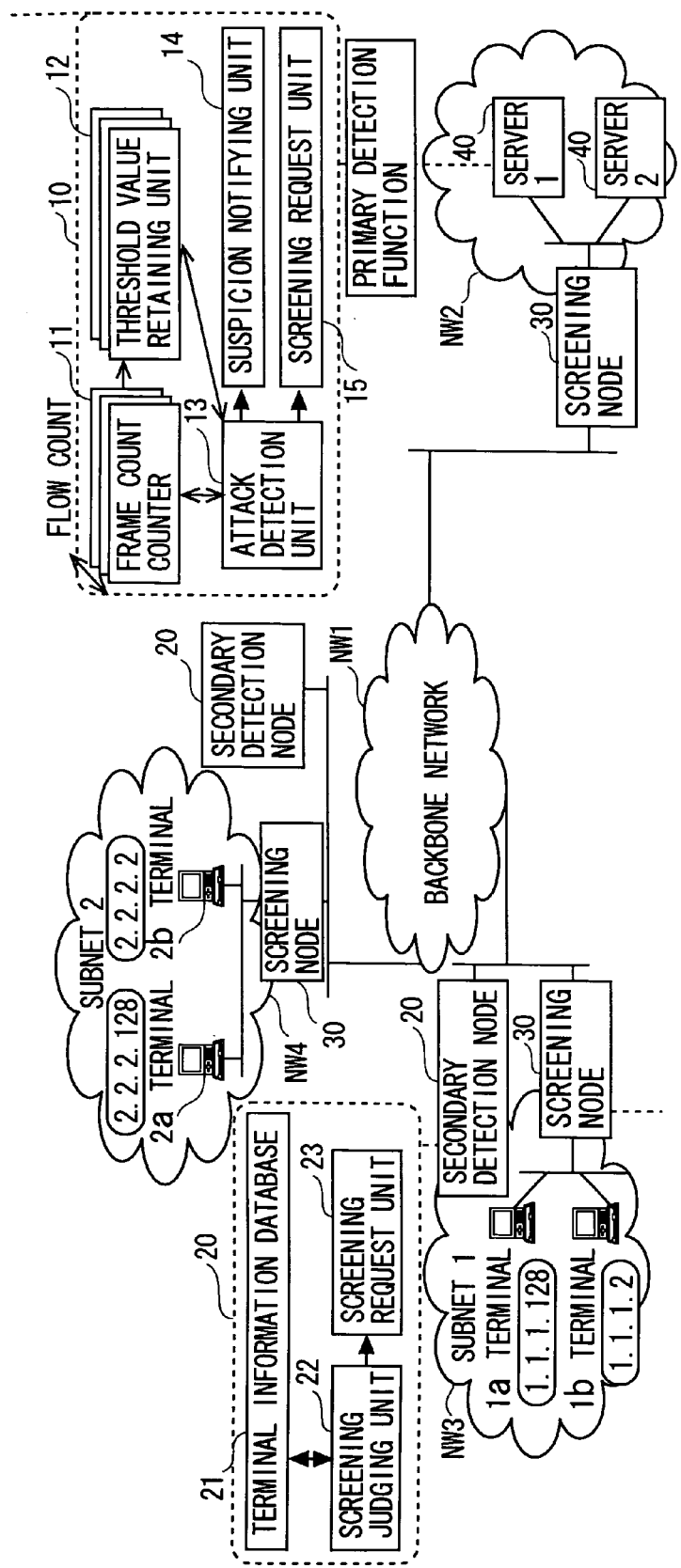
FIG. 16 is an explanatory diagram of a modified example of the primary detection node.

In the intrusion detection and prevention system SYS illustrated in FIGS. 1 and 2, a part or all of the respective functions of the primary detection node 10, the secondary detection node 20 and the screening node 30 may reside in the same node (see FIG. 15). Moreover, the function of the primary detection node 10 may be possessed by the server 40 (see FIG. 16). This contrivance enables the respective functions as those given above to be actualized with a small number of nodes.

Other Modified Examples (1) The detection of the suspicion of the attack and the detection of the determination of the attack may be based not on the received frame count as described above but on the frame count of the frames transmitted from, e.g., the server.

(2) On the terminal information database 21, what is associated with the reliability level information may be address information other than the IP address.

EFFECTS OF EMBODIMENTS (1) The detecting operation starts at the point of time when getting suspicious of the attack, and the screening judgment is made based on the terminal information and the server information, whereby the DoS attack such as the attacking action at the unspecified majority of users can be detected and prevented with the higher accuracy.

(2) Moreover, the initial measure for judging the attack is started sooner than based on the threshold value for judging the determination of the attack, and hence the more immediate screening from the attack can be attained. This is effective in reducing a missing attack due to a time-lag in the communication time in a mode of sending and receiving a message between the nodes. Further, the same effect can be expected also in a mode of sending and receiving within the node.

(3) Moreover, a deviation in the attack timing might occur depending on some attacks, and also the attack startup traffic, which could not detected from the single attack determination threshold value, can be detected.

(4) Further, the virus (detection) function, the topology management server, the terminal and the server in the network system cooperate to make it possible to give the alarm to the user earlier and more easily and to take the measure for the security at the early stage.

(5) Furthermore, the resources in the network system can be prevented from being depleted by the attack owing to the linkage with QoS.

Modified Examples

The processes in one embodiment discussed above are provided by way of a program executable by a computer, and the program can be provided as on a recording (storage) medium such as a CD-ROM and a flexible disc, and further can be provided via the communication line.

Moreover, the respective processes in one embodiment discussed above can be also executed in a way that selects and combines an arbitrary plurality or the whole of these processes.

What is claimed is:

1. An intrusion detection and prevention system detecting a denial-of-service attack and blocking a corresponding flow, the system comprising:
   a storing unit storing executable instructions; and
   a computer processor executing the executable instructions and being configured to include:
      a retaining unit for retaining at least one attack suspicion threshold value and an attack determination threshold value of which levels are different from each other in order to detect the attack, a value of the attack suspicion threshold value being greater than zero;
      a detecting unit for detecting an attack suspicion state when a frame count in the corresponding flow of an attack detection target exceeds the attack suspicion threshold value on the retaining unit, and detecting an attack determination state when the frame count exceeds the attack determination threshold value on the retaining unit;
      a notifying unit for notifying of the attack suspicion state together with corresponding flow information when the attack suspicion state is detected by the detecting unit;
      a judging unit for judging, based on a reliability level of at least one of a frame source terminal and the corresponding flow, whether the corresponding flow is blocked or not when notified of the attack suspicion state by the notifying unit;
      a requesting unit for performing a screening request together with notification of the corresponding flow information when the attack determination state is detected by the detecting unit; and
      a screening unit for blocking the corresponding flow based on any one of screening judgment by the judging unit and, even if the judging unit judges that the corresponding flow is not blocked based on the reliability level, the screening request by the requesting unit.

2. The intrusion detection and prevention system according to claim 1, further comprising a counting unit for counting a number of frames coincident with a specified pattern in predetermined time.

3. The intrusion detection and prevention system according to claim 1, further comprising a storage unit for associating address information of the frame source terminal with the reliability level,
   wherein the judging unit, when notified of the attack suspicion state together with the flow information, searches through the storage unit by referring to the flow information, and judges, based on the reliability level of at least one of the frame source terminal and the flow, whether to block the flow or not.

4. The intrusion detection and prevention system according to claim 3, wherein the reliability level is associated with information for identifying a dynamic address and a fixed address as the address information in order to make screenable from the source terminal having the fixed address through which spoofing is comparatively easily conducted at a point of time when getting in the attack suspicion state.

5. The intrusion detection and prevention system according to claim 3, wherein the reliability level is associated with an address-information-already-authenticated check value in order to make screenable from the source terminal having a non-authentication address through which spoofing is comparatively easily conducted at a point of time when getting in the attack suspicion state.

6. The intrusion detection and prevention system according to claim 3, wherein the reliability level is associated with at least one of a security patch application state to and a virus infected state from the source terminal on the storage unit in order to make screenable from the source terminal exhibiting a high occurrence probability of a terminal seizure or virus infection at a point of time when getting in the attack suspicion state.

7. The intrusion detection and prevention system according to claim 3, wherein user information of the source terminal is associated with the reliability level on the storage unit in order to make screenable at a point of time when getting in the attack suspicion state.

8. The intrusion detection and prevention system according to claim 1, further comprising a second detecting unit for detecting, as an acceleration value, a degree of increase/decrease in the frame count of frames belonging to the flow,
   wherein the retaining unit retains a second attack suspicion threshold value and a second attack determination threshold value of which levels to be compared with the acceleration value are different from each other, and
   the detecting unit detects the attack suspicion state when the acceleration value in the corresponding flow of the attack detection target exceeds the second attack suspicion threshold value, and detects the attack determination state when the acceleration value exceeds the second attack determination threshold value.

9. The intrusion detection and prevention system according to claim 1, wherein the judging unit judges, based on a notification count about the same flow when notified of the attack suspicion state, whether to block the flow or not.

10. The intrusion detection and prevention system according to claim 1, wherein the retaining unit is retained with a plurality of attack suspicion threshold values of which levels are different from each other together with information representing respective reliability levels,
the detecting unit detects the attack suspicion state when the frame count exceeds any one of the attack suspicion threshold values,
the notifying unit notifies of the attack suspicion state together with the information representing an associated reliability level when the attack suspicion state is detected, and
the judging unit judges, based on the information showing a notified reliability level when notified of the attack suspicion state together with the information representing the reliability level, whether to block the corresponding flow or not.

11. The intrusion detection and prevention system according to claim 10, wherein the judging unit judges, based on an added reliability level obtained by adding both of the reliability level of the frame source terminal and the information representing the notified reliability level when notified of the attack suspicion state together with the information representing the reliability level, whether to block the corresponding flow or not.

12. The intrusion detection and prevention system according to claim 10, further comprising a QoS judging unit for determining a QoS control level of the flow in accordance with the information representing the notified reliability level when the judging unit judges not to block the corresponding flow.

13. The intrusion detection and prevention system according to claim 11, further comprising a QoS judging unit for determining a QoS control level of the flow in accordance with the added reliability level when the judging unit judges not to block the corresponding flow.

14. An intrusion detection and prevention method detecting a denial-of-service attack and blocking a corresponding flow, the method comprising:
retaining at least one attack suspicion threshold value and an attack determination threshold value of which levels are different from each other in order to detect the attack, a value of the at least one attack suspicion threshold value being greater than zero;
detecting an attack suspicion state when a frame count in the corresponding flow of an attack detection target exceeds the attack suspicion threshold value, and detecting an attack determination state when the frame count exceeds the attack determination threshold value;
notifying of the attack suspicion state together with corresponding flow information when the attack suspicion state is detected;
judging, based on a reliability level of at least one of a frame source terminal and the corresponding flow, whether the corresponding flow is blocked or not when notified of the attack suspicion state;
performing a screening request together with notification of the corresponding flow information when the attack determination state is detected; and
blocking the corresponding flow based on any one of screening judgment and, even if judging that the corresponding flow is not blocked based on the reliability level, the screening request,
wherein at least one of the retaining, detecting, notifying, judging, performing and blocking are performed by a computer processor.

15. The intrusion detection and prevention method according to claim 14, further comprising:
detecting, as an acceleration value, a degree of increase/decrease in the frame count of frames belonging to the flow,
retaining a second attack suspicion threshold value and a second attack determination threshold value of which levels to be compared with the acceleration value are different from each other, and
detecting the attack suspicion state when the acceleration value in the corresponding flow of the attack detection target exceeds the second attack suspicion threshold value, and detecting the attack determination state when the acceleration value exceeds the second attack determination threshold value.

16. The intrusion detection and prevention method according to claim 14, further comprising:
retaining a plurality of attack suspicion threshold values of which levels are different from each other together with information representing respective reliability levels,
detecting the attack suspicion state when the frame count exceeds any one of the attack suspicion threshold values,
notifying of the attack suspicion state together with the information representing an associated reliability level when the attack suspicion state is detected, and
judging, based on the information showing a notified reliability level when notified of the attack suspicion state together with the information representing the reliability level, whether to block the corresponding flow or not.

17. The intrusion detection and prevention method according to claim 16, further comprising determining a QoS control level of the flow in accordance with the information representing the notified reliability level when judged not to block the corresponding flow.

* * * * *